US009881612B2

(12) United States Patent
Guzik (10) Patent No.: US 9,881,612 B2
(45) Date of Patent: Jan. 30, 2018

(54) AUTOMATED PORTABLE RECORDING DEVICE ACTIVATION

(71) Applicant: WHP Workflow Solutions, LLC, North Charleston, SC (US)

(72) Inventor: Thomas Guzik, Edina, MN (US)

(73) Assignee: WHP Workflow Solutions, LLC, North Charleston, SC (US)

( * ) Notice: Subject to any disclaimer, the term of this patent is extended or adjusted under 35 U.S.C. 154(b) by 228 days.

(21) Appl. No.: 14/732,598

(22) Filed: Jun. 5, 2015

(65) Prior Publication Data

US 2016/0360164 A1    Dec. 8, 2016

(51) Int. Cl.
| H04N 7/18 | (2006.01) |
| G10L 15/26 | (2006.01) |
| G07C 5/08 | (2006.01) |
| H04N 5/77 | (2006.01) |
| H04N 9/82 | (2006.01) |
| G06F 3/00 | (2006.01) |
| H04N 5/232 | (2006.01) |
| G10L 15/30 | (2013.01) |

(52) U.S. Cl.
CPC ............... G10L 15/26 (2013.01); G06F 3/00 (2013.01); G07C 5/0891 (2013.01); H04N 5/232 (2013.01); H04N 5/77 (2013.01); H04N 9/8205 (2013.01); H04N 9/8211 (2013.01); *G10L 15/30* (2013.01)

(58) Field of Classification Search
IPC ...................................................... G10L 15/26
See application file for complete search history.

(56) References Cited

U.S. PATENT DOCUMENTS

| 8,538,374 | B1* | 9/2013 | Haimo | G01S 19/17 370/259 |
| 2004/0117859 | A1* | 6/2004 | Ohel | H04M 1/6505 725/146 |
| 2006/0097879 | A1* | 5/2006 | Lippincott | A61B 5/02055 340/573.1 |
| 2011/0018998 | A1* | 1/2011 | Guzik | H04N 21/21 348/143 |
| 2013/0065628 | A1* | 3/2013 | Pfeffer | G08B 25/006 455/521 |
| 2013/0235209 | A1* | 9/2013 | Lee | H04N 5/765 348/159 |
| 2015/0281445 | A1* | 10/2015 | Kumar | H04M 3/5166 379/88.01 |
| 2016/0241807 | A1* | 8/2016 | Kovac | H04N 5/77 |

\* cited by examiner

*Primary Examiner* — Tracy Y Li
(74) *Attorney, Agent, or Firm* — Han Santos, PLLC (57) ABSTRACT

Portable recording devices used by a person, such as a law enforcement officer, may be automatically activated to capture data assets. A dispatch request may be sent from a server to a computing device used by person equipped with a portable recording device. Subsequently, the server may determine whether the portable recording device is activated by the computing device to record a data asset. In response to a determination that there is a lack of activation of the portable recording device by the computing device to record the data asset following the dispatch request, the server may activate the portable recording device of the person to record the data asset.

20 Claims, 8 Drawing Sheets

AUTOMATED PORTABLE RECORDING DEVICE ACTIVATION

BACKGROUND

Law enforcement agencies are increasingly equipping their law enforcement officers with portable recording devices. Such law enforcement agencies may have policies mandating that their law enforcement officers use these portable recording devices to record their interactions with the public. These recordings may serve to protect the public from improper policing, as well as protect law enforcement officers from false allegation of police misconduct. However, law enforcement officer may sometimes forget or is unable to activate their portable recording devices in stressful or exigent situations. In some instances, such lack of recordings may make it difficult for a law enforcement agency to investigate criminal activities, identify perpetrators of crimes, or examine allegations of police misconduct.

SUMMARY

Described herein are techniques for using automated activation to ensure that portable recording device used by law enforcement officers are activated at the appropriate times to capture data assets. The portable recording device may be a portable recording device or a hand-held recording device that is capable of capturing images and/or sound. The data assets may be in the form of video recordings, audio recordings, or multimedia recordings. The techniques may further include automatically prompting a law enforcement officer to provide additional audio data regarding each data asset following the recording of the data asset. The additional audio data may be automatically converted to text data at a network operations center. In this way, the text data for each data asset may be used to further classify the captured data assets into groups according to incidents, events, cases, and/or so forth.

The automated activation of the portable recording device may be executed by an activation mechanism that is located in the portable recording device, on a computing device located in a law enforcement vehicle, or at a network operations center. The activation mechanism may serve to ensure that the portable recording device used by the law enforcement officer is automatically activated even in instances in which the law enforcement officer is unable to manually activate the device. In other instances, the activation mechanism may use body metrics of the law enforcement officer to trigger an activation of the portable recording device. In additional instances, the activation mechanism may trigger the activation following the dispatch of the law enforcement officer to an incident or scene.

In at least one embodiment, a dispatch request may be sent from a server to a computing device used by a person equipped with a portable recording device. Subsequently, the server may determine whether the portable recording device is activated by the computing device to record a data asset. In response to a determination that there is a lack of activation of the portable recording device by the computing device to record the data asset following the dispatch request, the server may activate the portable recording device of the person to record the data asset.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for using automated activation to ensure that portable recording device used by law enforcement officers are activated at the appropriate times to capture data assets. The portable recording device may be a portable recording device or a hand-held recording device that is capable of capturing images and/or sound. A portable recording device may be a recording device that is worn on the body or on the clothing of a person. A hand-held recording device may be a recording device that can be carried and moved by a person using a part of the person's body. The data assets may be in the form of video recordings, audio recordings, or multimedia recordings. The techniques may further include automatically prompting a law enforcement officer to provide additional audio data regarding each data asset following the recording of the data asset. For example, the additional audio data may be an incident identifier, an event identifier, or a case number. In another example, the additional audio data may be a code word, in which the code word is pre-assigned to represent an incident, an event, or a case. The additional audio data may be automatically converted to text data at a network operations center. In this way, the text data for each data asset may be used to further classify the captured data assets into groups according to incidents, events, cases, and/or so forth.

The automated activation of the portable recording device may be executed by an activation mechanism that is located in the portable recording device, on a computing device located in a law enforcement vehicle, or at a network operations center. The activation mechanism may serve to ensure that the portable recording device used by the law enforcement officer is automatically activated even in instances in which the law enforcement officer is unable to manually activate the device. In some embodiments, the activation mechanism may use the body metrics of the law enforcement officer to trigger an activation of the portable recording device. For example, the activation mechanism may activate a portable recording device used by a law enforcement after detecting that the law enforcement officer has an elevated heart rate. In other embodiments, the activation mechanism may trigger the activation following the dispatch of the law enforcement officer to an incident or scene. In such embodiments, the activation mechanism may work in concert with a dispatch mechanism that is located at the network operations center.

The techniques may ensure that portable recording devices used by law enforcement officers are activated at the appropriate time even without the direct intervention of the law enforcement officers. Accordingly, such techniques may reduce or eliminate instances in which probative video recordings are not captured because law enforcement officers inadvertently forgot or are otherwise unable to activate portable recording devices. Thus, the automated activation of portable recording devices may enhance the abilities of law enforcement agencies to investigate criminal activities, identify perpetrators of crimes, or examine allegations of police misconduct. Example implementations are provided below with reference to the following figures.

Example Architecture

Figure 1:
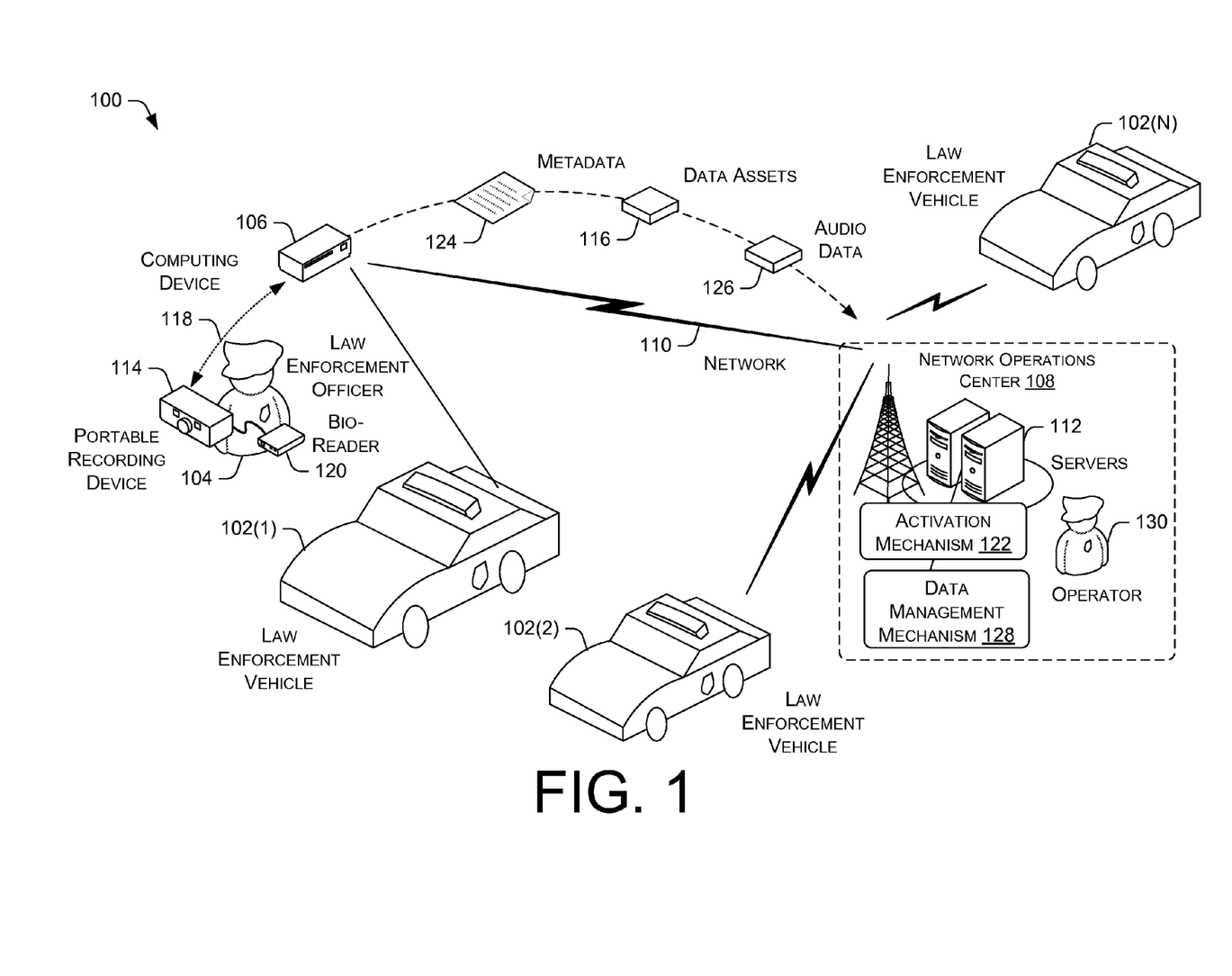
FIG. 1 illustrates an example architecture for implementing the automated activation of a portable recording device for law enforcement use.

FIG. 1 illustrates an example architecture 100 for implementing the automated activation of a portable recording device for law enforcement use. The architecture 100 may include law enforcement vehicles 102(1)-102(N). Each of the law enforcement vehicles may be equipped with a mobile computing device. For example, the law enforcement vehicle 102(1) operated by a law enforcement officer 104 may be equipped with the computing device 106. The computing device 106 may be part of a computer-assisted dispatch system. Accordingly, the computing device 106 may communicate with a network operations center 108 via a network 110. The network operations center 108 may be a command center that is part of a law enforcement agency, or a facility that is operated by a third-party that is offering services to the law enforcement agency. The network operations center 108 may include servers 112 that implement the computer-assisted dispatch system. The network 110 may be a local area network ("LAN"), a larger network such as a wide area network ("WAN"), a carrier network, or a collection of networks, such as the Internet. Protocols for network communication, such as TCP/IP, may be used to implement the network 110. The carrier network may provide telecommunication and data communication in accordance with one or more technical standards.

The computing device 106 may include output devices (e.g., a display screen) on which dispatch data and associated law enforcement information may be displayed. The computing device 106 may also include input device (e.g., a keyboard) by which the law enforcement officer 104 may enter requests for law enforcement information, responses to dispatch requests, resolution reports for incidents or events, and/or so forth.

The law enforcement officer 104 may be equipped with a portable recording device 114. The portable recording device 114 may be a portable video recording device, a portable audio recording device, or a portable multimedia recording device that records both video and audio data. The portable recording device 114 may include on-board memory that stores the recordings, the audio recordings, or the multimedia recordings as data assets 116. Additionally, the portable recording device 114 may be equipped with communication capabilities. In some instances, the portable recording device 114 may form an ad-hoc communication connection 118 with the computing device 106. In other instances, the portable recording device 114 may communicate directly with the network operations center 108 via the network 110. In alternative embodiments, the computing device 106 may be a portable computing device that is carried on the body of the law enforcement officer 104.

The portable recording device 114 may be manually activated to record the data assets 116 by the law enforcement officer 104. For example, the portable recording device 114 may include an input interface (e.g. physical buttons, a gesture recognition mechanism, a voice activation mechanism) that enables the law enforcement officer 104 to start, stop, and/or pause the recording of the data assets 116.

The portable recording device 114 may be communicatively coupled to a bio-reader 120. The communication connection between the portable recording device 114 and the bio-reader 120 may be a wired connection or a wireless connection. The bio-reader 120 may be a device that monitors the body metrics of the law enforcement officer 104. The body metrics may include pulse rate, body temperature, gait speed or acceleration, blood pressure, perspiration rate, and/or so forth. The portable recording device 114 may be activated to record data assets 116 based on one or more body metrics obtained by the bio-reader 120.

For example, a pulse rate that exceeds a normal resting pulse rate range of the law enforcement officer 104 may indicate that the officer is under stress or exertion. Such stress or exertion may be due to officer confronting or capturing a suspect. In such an example, the portable recording device 114 may be automatically activated based on the excess pulse rate to record data asset. On the other hand, a pulse rate that is below a normal resting pulse rate range of the officer may indicate that the officer is sick or injured. In such a situation, the portable recording device 114 may automatically activate to possibly capture the cause of the illness or injury. In a further example, the bio-reader 120 may capture a gait speed of the officer that indicates the officer is running. Such a gait speed may indicate that the officer is responding to an emergency or pursuing a suspect. Accordingly, the portable recording device 114 may be once again activated to capture a data asset that contains useful information.

In some embodiments, the analysis of the body metrics to activate the portable recording device 114 may be performed by a metrics analyzer in the device. However, in other embodiments, such analysis for the purpose of activating the portable recording device 114 may be performed by a metrics analyzer that is located in the computing device 106 or at the network operations center 108. In these embodiments, the bio-reader 120 may transmit the captured body metrics to the computing device 106 by the ad-hoc communication connection 118, or to the network operations center 108 via the network 110 for analysis. In turn, the computing device 106 may send an activation signal to the portable recording device 114 via the ad-hoc communication connection 118. Likewise, the network operations center 108 may send an activation signal to the portable recording device 114 via the network 110. Alternatively, the network operations center 108 may send the activation signal to the computing device 106 via the network 110, such that the computing device 106 may relay the activation signal to the portable recording device 114.

In other embodiments, the network operations center 108 may automatically activate the portable recording device 114 following the transmission of dispatch information to the computing device 106. In such embodiments, an activation mechanism 122 executed by the servers 112 of the network operations center 108 may determine that a dispatch request has been sent to the computing device 106. Subsequently, the activation mechanism 122 may query the portable recording device 114 and/or the computing device 106 to ascertain whether the portable recording device 114 has been activated to the record a data asset within a predetermined time period. Thus, if the portable recording device 114 has not be activated to record the data asset within the predetermined time period, the activation mechanism 122 may activate the portable recording device 114 to record the data asset. In some instances, the activation signal from the activation mechanism 122 may be relayed to the portable recording device 114 by the computing device 106.

The portable recording device 114 may be configured to tag each recorded data asset with metadata 124. In various embodiments, the metadata 124 may include a time and date stamp, a name of the associated law enforcement officer, a badge number of the associated law enforcement officer, a location at which the data asset is captured, and/or so forth. In some instances, a data asset may be further tagged with dispatch information if the capture of the data asset is triggered by the computing device 106 or the network operations center 108.

In some embodiments, the portable recording device 114 may automatically prompt the law enforcement officer 104 to provide audio data 126 for a data asset after the recording of the data asset is completed. In some instances, the audio data 126 may include an incident identifier, an event identifier, a case number, an involved party name, and/or so forth. In other instances, the additional audio data may be a code word, in which the code word is pre-assigned to represent an incident, an event, or a case. The metadata 124 and the audio data 126 may be transmitted with their associated data assets 116 to the network operations center 108.

In turn, a data management mechanism 128 implemented on the servers 112 of the network operations center 108 may classify the data assets 116 based on the metadata 124 and the audio data 126. In at least one embodiment, the data management mechanism 128 may use a speech-to-text algorithm to convert the audio data 126 of the data assets 116 into text data. Subsequently, the data management mechanism 128 may classify the data assets 116 into groups based on the text data. For example, the groups may be incidents, events, cases, etc. In some instances, the data management mechanism 128 may further organize the data assets in each group according to the metadata 124. For example, the data assets in a particular group may be sorted into chronological order by the data management mechanism 128. In another example, the data assets may be aggregated with other pre-existing data that pertain to similar incidents, events, times, cases, and/or so forth. In this way, an operator 130 at the network operations center 108 may use specific queries to find details and information, so that relevant data may be retrieved from the servers 112.

Example Portable Recording Device Components

Figure 2:
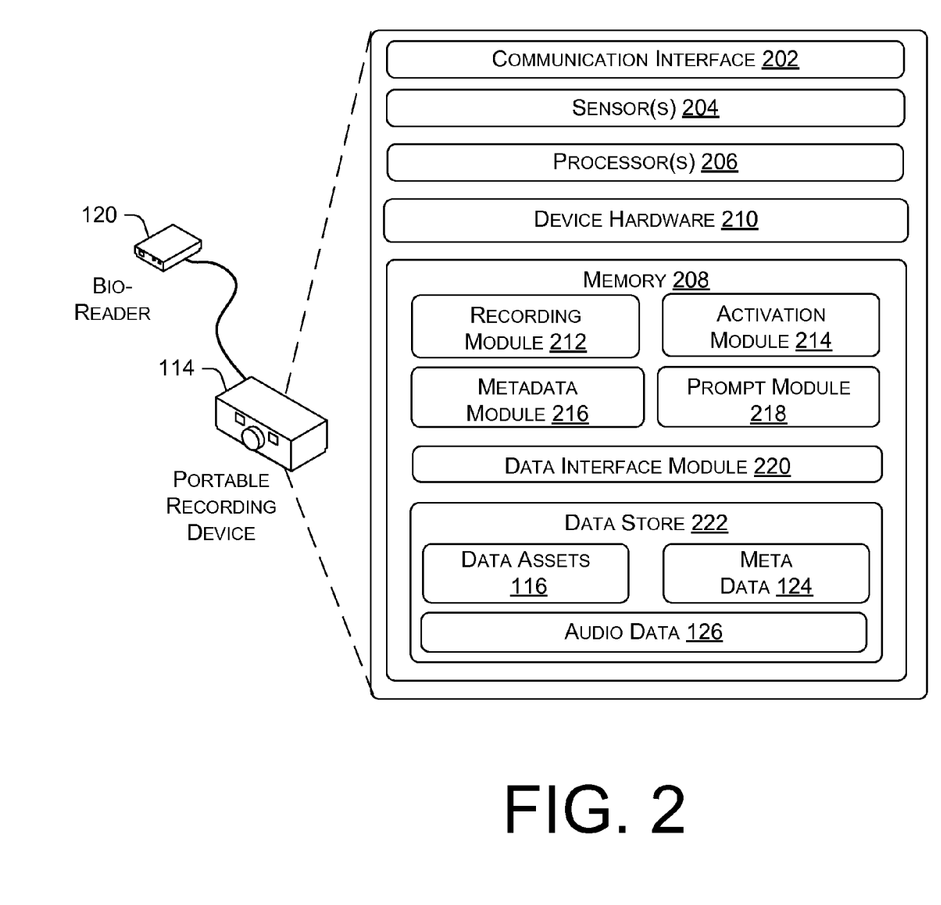
FIG. 2 is a block diagram showing various components of a portable recording device that automatically activates for law enforcement use.

FIG. 2 is a block diagram showing various components of a portable recording device 114 that automatically activates for law enforcement use. As described with respect to FIG. 1, the portable recording device 114 may be communicatively coupled to the bio-reader 120. The portable recording device 114 may be equipped with a communication interface 202, one or more sensors 204, one or more processors 206, and memory 208. The communication interface 202 may include wireless and/or wired communication components that enable the device to transmit or receive voice or data communication via the network 110, as well as other telecommunication and/or data communication networks. The sensors 204 may include a compass, an accelerometer, and/or a global positioning system (GPS) sensor. The compass, the accelerometer, and the GPS sensor may detect orientation, movement, and geolocation of the portable recording device 114.

The memory 208 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The device hardware 210 may include a camera, a microphone, and user interface hardware, such as physical buttons, a gesture recognition mechanism, or a voice activation mechanism. The device hardware 210 may further include signal converters, antennas, modems, hardware decoders and encoders, graphic processors, a subscriber identity module (SIM) card slot, and/or the like that enable the portable recording device 114 to execute applications and provide telecommunication and data communication functions.

The one or more processors 206 and the memory 208 of the portable recording device 114 may implement a recording module 212, an activation module 214, a metadata module 216, a prompt module 218, and a data interface module 220. These modules may include routines, program instructions, objects, and/or data structures that perform particular tasks or implement particular abstract data types. The memory 208 may also provide a data store 222. The recording module 212 may record data assets 116 via a camera and/or a microphone. The data assets 116 may be in the form of video recordings, audio recordings, and/or multimedia recordings. Accordingly, the recording module 212 may include codecs, signal filters, coding functions, and/or error correction functions that enable the recording module 212 to convert generate digital files from camera and microphone signal inputs. In various embodiments, the recording module 212 may store the data assets in the data store 224. The recording module 212 may send its function status, such as recording started, recording stopped, recording paused, record error, etc., to the computing device 106 and/or the network operations center 108 via the data interface module 220. Each function status may include relevant coded information. For example, the recording started status may contain coded information indicating whether the recording function is activated via a manual input at the recording device, a manual input from the computing device 106, an activation signal from the computing device 106, or an activation signal from the network operations center 108. In another example, a record error status may include coded information that signifies conditions such as hardware failure, software error, lack of memory, low battery, and/or so forth.

The activation module 214 may activate the recording module 212 to capture data assets based on an activation signal from the computing device 106 or the network operations center 108. The activation module 214 may also receive manual inputs that start, stop, or pause the recording of data assets via a user interface of the portable computing device 114. The computing device 106 may generate an activation signal upon receiving a user input at the device. However, in other embodiments, the computing device 106 may include a metric analyzer that evaluates the body metrics of a law enforcement officer. Accordingly, the computing device 106 may generate the activation signal based on an analysis result from the computing device 106. The network operations center 108 may generate an activation signal for the recording module 212 in response to determining that a dispatch request has been sent to the computing device 106.

In other embodiments, the activation module 214 may include a metrics analyzer that evaluates the body metrics of the law enforcement officer as received from the bio-reader. The body metrics may include pulse rate, body temperature, gait speed or acceleration, blood pressure, perspiration rate, and/or so forth. Accordingly, the portable recording device 114 may be activated to record data assets 116 based on each of the one or more body metrics obtained by the bio-reader 120 being higher or lower than a corresponding predetermined threshold or a corresponding threshold range. In some embodiments, the activation module 214 may perform the analysis of the body metrics to potentially activate the recording module 212 after determining that no manual activation input and/or activation signal from another device is received within a predetermined time period after a dispatch request is received by the computing device 106.

For example, a pulse rate that exceeds a normal resting pulse rate range of the law enforcement officer 104 may indicate that the officer is under stress or exertion. In such an example, the activation module 214 may automatically activate the recording module 212. In another example, an analysis of the perspiration rate of the officer as captured by the bio-reader 120 may indicate that the officer is perspiring more than normal. This perspiration rate may indicate that the officer is responding to an emergency or is otherwise under stress. Accordingly, the activation module 214 may activate the recording module 212 to capture a data asset that may contain useful information.

In further instances, the activation module 214 may activate the recording module 212 when multiple body metrics indicate that the law enforcement officer 104 is likely to be in a stressful situation. For example, the law enforcement officer 104 may be patrolling on a particular hot day that causes the officer's perspiration rate to be higher than a predetermined normal threshold. However, this alone is not sufficient to cause the activation module 214 to activate the recording module 212. Instead, the activation module 214 may activate the recording module 212 when there are one or more other corroborating changes in the body metrics of the law enforcement officer 104. Such corroborating changes may include an elevated pulse rate above a resting threshold range, an increase in gait speed above a walking range, an elevation in blood pressure above a predetermined normal threshold, and/or so forth.

The metadata module 216 may tag data assets that are recorded by the recording module 212. In various embodiments, the metadata 124 may include a time and date stamp, a name of the associated law enforcement officer, a badge number of the associated law enforcement officer, a location at which at the data asset is captured, and/or so forth. In some instances, the metadata module 216 may tag a data asset with dispatch information when the capture of the data asset is triggered by the computing device 106 or the network operations center 108.

The prompt module 218 may generate a prompt that causes the law enforcement officer 104 to provide additional audio data regarding each data asset that is recorded by the recording module 212. The prompt may be presented by the device hardware 210 of the portable recording device 114. In various embodiments, the prompt may be in the form of an audio tone, computer generated speech, text information, an indicator light, and/or so forth. In response to the prompt, the law enforcement officer 104 may provide audio data that includes an incident identifier, an event identifier, a case number, an involved party name, and/or so forth. Alternatively, the law enforcement officer may provide a code word, in which the code word is pre-assigned to represent an incident, an event, or a case.

The data interface module 220 may transmit the captured data assets 116, the metadata 124, the audio data 126, as well as other data to the computing device 106 or the network operations center 108. In some embodiments, the data interface module 220 may transmit each data asset after the data asset is tagged with its associated audio data. In other embodiments, the tagged data assets may be stored in the data store 224. In such embodiments, the data interface module 220 may periodically transmit the tagged data assets according to a predetermined schedule. In still other embodiments, the data interface module 220 may transmit the tagged data assets to a corresponding recipient entity (e.g., the computing device 106 or the network operations center 108) upon receiving a data asset request from the party. In further embodiments, the data interface module 220 may also support the direct download of the data assets from the portable recording device 114 through a physical connection. For example, the data assets may be downloaded from the portable recording device 114 via a universal serial bus (USB) interface. The data interface module 220 may use the communication interface 202 to perform the transmission or the transfer of the data assets.

The data store 222 may include one or more databases, such as relational databases, object databases, object-relational databases, and/or key-value databases that store data. In at least some embodiments, the data store 222 may store the data assets 116, metadata 124, and the audio data 126.

Example Computing Device Components

Figure 3:
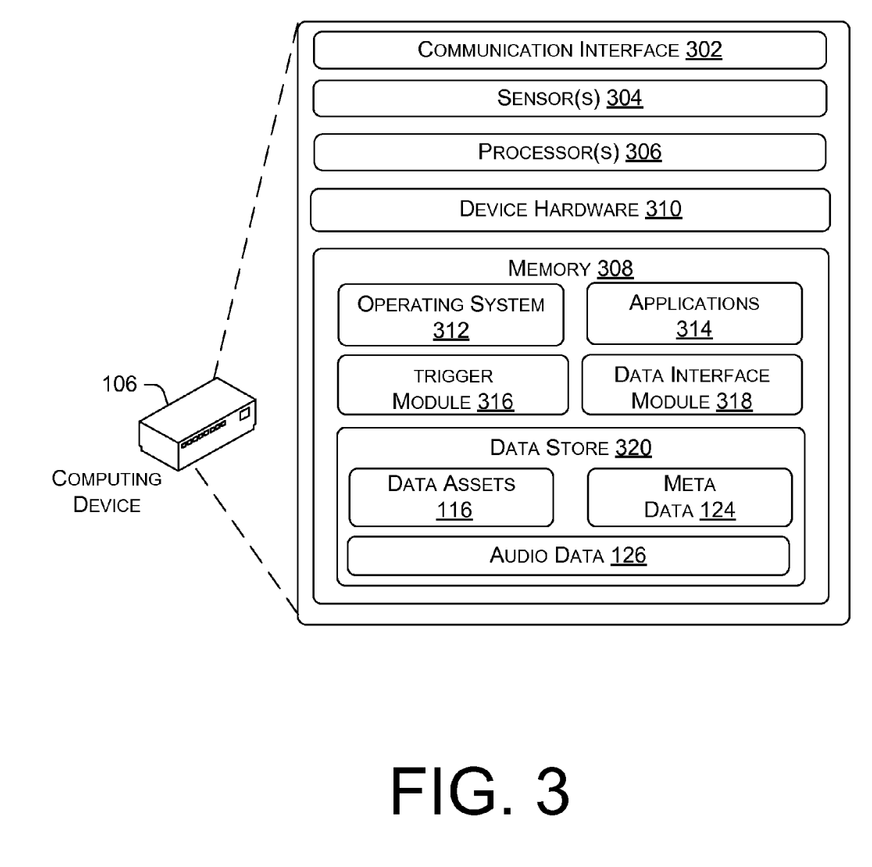
FIG. 3 is a block diagram showing various components of a computing device that automatically activates a portable computing device for law enforcement use.

FIG. 3 is a block diagram showing various components of a computing device 106 that automatically activates a portable computing device for law enforcement use. The computing device 106 may be equipped with a communication interface 302, one or more sensors 304, one or more processors 306, and memory 308. The communication interface 302 may include wireless and/or wired communication components that enable the device to transmit or receive voice or data communication via the network 110, as well as other telecommunication and/or data communication networks. The sensors 304 may include a compass, an accelerometer, and/or a global positioning system (GPS) sensor. The compass, the accelerometer, and the GPS sensor may detect orientation, movement, and geolocation of the computing device 106.

The memory 308 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The device hardware 310 may include other hardware that is typically located on a computing device. For example, the device hardware 310 may include signal converters, antennas, modems, hardware decoders and encoders, graphic processors, a subscriber identity module (SIM) card slot, and/or the like that enable the computing device 106 to execute applications and provide telecommunication and data communication functions.

The one or more processors 306 and the memory 308 of the computing device 106 may implement an operating system 312 and applications 314. The operating system 312 may include components that enable the computing device 106 to receive and transmit data via various interfaces (e.g., user controls, communication interface 302, and/or memory input/output devices). The operating system 312 may also process data using the one or more processors 306 to generate outputs based on inputs that are received via hardware interfaces and software user interfaces. For example, the operating system 312 may provide an execution environment for executing the applications 314. The operating system 312 may include a presentation component that presents the output (e.g., display the data on an electronic display, store the data in memory, transmit the data to another electronic device, etc.). The operating system 312 may include other components that perform various other functions generally associated with an operating system. For example, the operating system 312 may enable a user to interact with the applications 314 and other modules stored in the memory 308. The applications 314 may include utility and productivity applications. For example, the applications 314 may include telephony applications, electronic communication applications, and mobile data terminal applications to display dispatches and related information received from the network operations center 108.

The one or more processors 306 and the memory 308 of the computing device 106 may further implement a trigger module 316 and a data interface module 318. These modules may include routines, program instructions, objects, and/or data structures that perform particular tasks or implement particular abstract data types. The memory 308 may also provide a data store 320. The trigger module 316 may send activation signals to the portable recording device 114. The activation signals may be sent via the trigger module 316 in response to manual inputs to the module. In other instances, the activation signals may have originated from the network operations center 108, and the trigger module 316 may simply relay such signals to the portable recording device 114.

In some embodiments, the trigger module 316 may send an activation signal in response to changes in the body metrics of the law enforcement officer 104. In such embodiments, the computing device 106 may receive the body metrics that are captured by the bio-reader 120 via a direct communication connection between the bio-reader 120 and the computing device 106. Alternatively, the portable recording device 114 that is connected to the bio-reader 120 may serve to relay the body metrics obtained by the bio-reader 120 to the computing device 106. Accordingly, the trigger module 316 may include a metrics analyzer that evaluates the body metrics of the law enforcement officer 104. As such, the trigger module 316 may send an activation signal to the portable recording device 114 based on each of the one or more body metrics obtained by the bio-reader 120 being higher or lower than a corresponding predetermined threshold or a corresponding threshold range. In some embodiments, the trigger module 216 may perform the analysis of the body metrics to potentially activate the portable computing device 114 after determining that the portable computing device 114 is not activated by other means within a predetermined time period after a dispatch request is received by the portable computing device 114.

The data interface module 318 may be configured to facilitate communication between the portable recording device 114 and the network operations center 108 by relaying data between these entities. For instance, the data interface module 318 may provide activation signals that are generated by the trigger module 316 to the portable recording device 114. Alternatively, the data interface module 318 may relay activation signals from the network operations center 108 and dispatch request status to the portable recording device 114. The dispatch request status may indicate that a dispatch request has been received at the computing device 106 from the network operations center 108. In other instances, the data interface module 318 may receive tagged data assets from the portable recording device 114. In turn, the data interface module 318 may store the tagged data assets in the data store 322. The tagged data assets may also be sent by the data interface module 318 to the network operations center 108 upon a request from the network operations center 108. In some instances, the data interface module 318 may also relay body metrics from the bio-reader 120 to the network operations center 108. In alternative embodiments, the trigger module 316 and the data interface module 318 may be part of one or more applications, such as a mobile terminal application.

The data store 320 may include one or more databases, such as relational databases, object databases, object-relational databases, and/or key-value databases that store data. In at least some embodiments, the data store 320 may store the data assets 116, metadata 124, and the audio data 126.

Example Server Components

Figure 4:
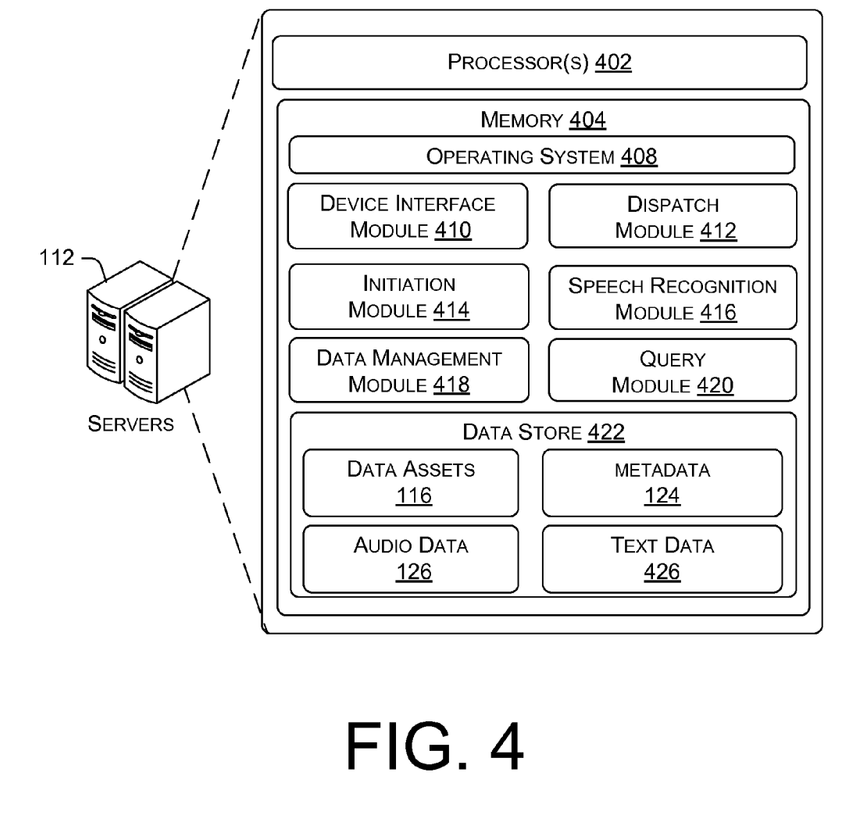
FIG. 4 is a block diagram showing various components of network operations center servers that automatically activate a portable computing device for law enforcement use.

FIG. 4 is a block diagram showing various components of network operations center servers 112 that automatically activate a portable computing device for law enforcement use. The servers 112 may include one or more processors 404, memory 406, and/or user controls that enable a user to interact with the servers. The memory 406 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism.

The servers 112 may have network capabilities. For example, the servers 112 may exchange data with other electronic devices (e.g., laptops, computers, other servers, etc.) via one or more networks, such as the Internet. Communications between the servers 112 and the other electronic devices may utilize any sort of communication protocol for sending and receiving messages, such as TCP/IP and/or HTTP. In some embodiments, the servers 112 may be substituted with a plurality of networked servers, such as servers in a cloud computing network.

The one or more processors 404 and the memory 406 of the servers 112 may implement an operating system 408. The operating system 408 may include components that enable the servers 112 to receive and transmit data via various inputs (e.g., user controls, network interfaces, and/or memory devices), as well as process data using the one or more processors 404 to generate output. The operating system 408 may include a presentation component that presents the output (e.g., display the data on an electronic display, store the data in memory, transmit the data to another electronic device, etc.). Additionally, the operating system 408 may include other components that perform various additional functions generally associated with an operating system. The one or more processors 404 and the memory 406 of the servers 112 may also implement a device interface module 410, a dispatch module 412, an initiation module 414, a speech recognition module 416, a data management module 418, and a query module 420. These modules may include routines, program instructions, objects, and/or data structures that perform particular tasks or implement particular abstract data types. The memory 406 may also include a data store 422.

The device interface module 410 may facilitate communication with the computing device 106 and the portable recording device 114. In various embodiments, the device interface module 410 may receive body metrics information, tagged data assets, as well as other data from the computing device 106 and/or the portable recording device 114. In at least some embodiments, the tagged data assets may be data assets 116 that are tagged with metadata 124 and the audio data 126. In turn, the device interface module 410 may transmit dispatch information, activation signals, as well as other data to the computing device 106 and/or the portable recording device 114.

The dispatch module 412 may send dispatch requests to the computing device 106. In various embodiments, the dispatch module 412 may be part of a computer-assisted dispatch system. The dispatch request may include an incident location, time and date of the incident, an incident description, identification of parties involved in the incident, type of assistance requested for the incident, and/or so forth. In turn, the dispatch module 412 may receive information from the computing device 106. The information may include resolution reports, updates to incident and party descriptions, time and dates of incident resolution, and/or so forth.

The initiation module 414 may send activation signals to the portable recording device 114. The portable recording device 114 may start the recording of a data asset in response to the activation signal. In some embodiments, the initiation module 414 my send an activation signal following the transmission of a dispatch request. For instance, after a dispatch module 412 has sent a dispatch request to the computing device 106, the initiation module 414 may query the portable recording device 114 and/or the computing device 106. The query may be used to ascertain whether the portable recording device 114 has been activated to record a data asset within a predetermined time period. Thus, if the portable recording device 114 has not be activated to record the data asset within the predetermined time period, the initiation module 414 may send an activation signal to the portable recording device 114. In some embodiments, the activation signal from the initiation module 414 may be received by the computing device 106, which in turn relays the activation signal to the portable recording device 114.

In alternative embodiments, the initiation module 414 may send an activation signal in response to changes in the body metrics of the law enforcement officer 104. In such embodiments, the initiation module 414 may receive the body metrics that are captured by the bio-reader 120 via a direct communication connection between the bio-reader 120 and the servers 112. Alternatively, the portable recording device 114 that is connected to the bio-reader 120 may serve to relay the body metrics obtained by the bio-reader 120 to the servers 112. The initiation module 414 may include a metrics analyzer that evaluates the body metrics of the law enforcement officer 104. As such, the trigger module 316 may send an activation signal to the portable recording device 114 based on each of the one or more body metrics obtained by the bio-reader 120 being higher or lower than a corresponding predetermined threshold or a corresponding threshold range.

The speech recognition module 416 may convert the audio data associated with a data asset into text data. In various embodiments, the speech recognition module 416 may include a speech-to-text algorithm that performs the transformation. The speech-to-text algorithm may be trained using various approaches, such as supervised learning, unsupervised learning, semi-supervised learning, naïve Bayes, Bayesian networks, decision trees, neural networks, fuzzy logic models, and/or probabilistic classification models. As such, the speech recognition module 416 may convert audio data 126 into text data 426.

The data management module 418 may classify the data assets 116 into groups based on the text data 426. For example, the groups may be incidents, events, cases, etc. Thus, the data management module 418 group data assets that pertain to each common incident, a common event, or a common case into one group based on their text data. The data management module 418 may further organize the data assets in each group according to their metadata 124. For example, the data assets in a particular group may be sorted into chronological order by the data management module 418 based on the metadata 124. In another example, the data management module 418 may aggregated data assets with other pre-existing data that pertain to similar incidents, events, times, cases, and/or so forth, based on the text data 426 and/or the metadata 124.

The query module 420 may present specific data assets in response to queries. The queries may be for information that pertain to specific incidents, events, cases, time periods, and/or so forth. Accordingly, the query module 420 may retrieve the data assets that match one or more search criteria for the data store 422. The retrieved data assets may be presented by the query module 420 for viewing via a selection and playback user interface. In various embodiments, the retrieved data assets may be present in conjunction with their associated metadata, audio data, and/or text data. The data assets and their associated data may be presented side by side, in rotation, or in a composite form to an authorized user, such as the operator 130.

The data store 422 may include one or more databases, such as relational databases, object databases, object-relational databases, and/or key-value databases that store data. In at least some embodiments, the data store 320 may store the data assets 116, metadata 124, the audio data 126, and the text data 426.

Example Processes

FIGS. 5-8 present illustrative processes 500-800 for performing automated portable recording device activation. Each of the processes 500-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500-800 are described with reference to the architecture 100 of FIG. 1.

Figure 5:
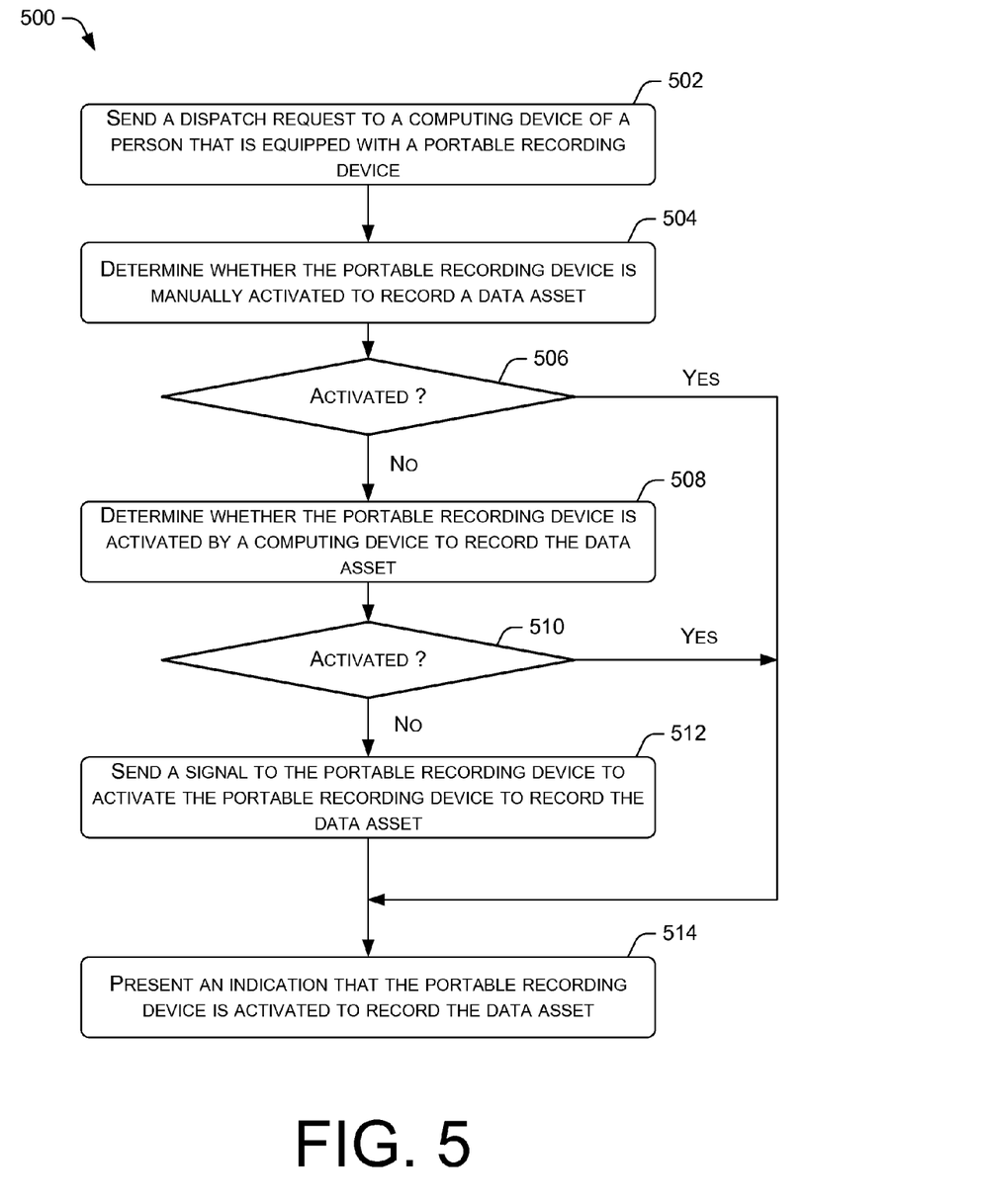
FIG. 5 is a flow diagram of an example process for activating a portable recording device that is used by a person.

FIG. 5 is a flow diagram of an example process 500 for activating a portable recording device that is used by a person. At block 502, the network operation center 108 may send a dispatch request to a computing device 106 of a person, such as a law enforcement officer, that is equipped with the portable recording device 114. The dispatch request may include an incident location, time and date of the incident, an incident description, identification of parties involved in the incident, type of assistance requested for the incident, and/or so forth. The computing device 106 may be a mobile data terminal that is located in the law enforcement vehicle 102(1).

At block 504, the network operations center 108 may determine whether the portable recording device 114 of the person is manually activated to record a data asset. In various embodiments, the network operations center 108 may make such a determination based on a function status that is reported by the portable recording device 114. Thus, at the decision block 506, if the network operations center 108 determines that the portable recording device is not activated ("no" at decision block 506), the process 500 may proceed to block 508.

At block 508, the network operations center 108 may determine whether the portable recording device 114 is activated by the computing device 106. In some instances, the computing device 106 may be located in a law enforcement vehicle or carried by the law enforcement officer. In various embodiments, the network operations center 108 may make such a determination based on a function status that is reported by the portable recording device 114. The computing device 106 may activate the portable recording device 114 in response to a manual input of the person or by performing an analysis of the body metrics of the person. Thus, at the decision block 510, if the network operations center 108 determines that the portable recording device 114 is not activated ("no" at decision block 510), the process 500 may proceed to block 512. At block 512, the network operations center 108 may send an activation signal to the portable recording device 114 to cause the portable recording device to start recording the data asset. In some embodiments, the network operations center 108 may send the activation after determining that the portable computing device 114 has not been activated and a predetermined time period has elapsed. This time period may serve to provide an opportunity for other mechanisms on the portable recording device 114 or the computing device 106 to activate the portable recording device 114. For example, the time period may be a duration of 10 seconds, 20 seconds, 40 seconds, etc.

At block 514, the network operations center 108 may present a function status indicating that the portable recording device 114 is activated to record the data asset. The function status may be presented to the operator 130 via a display. In various embodiments, the data asset may be in the form of a video recording, an audio recording, or a multimedia recording.

Returning to decision block 506, if the network operations center 108 determines that the portable recording device is activated ("yes" at decision block 506), the process 500 may proceed directly to block 514. Similarly, returning to decision block 510, if the network operations center 108 determines that the portable recording device is activated ("yes" at decision block 510), the process 500 may also proceed directly to block 514.

Figure 6:
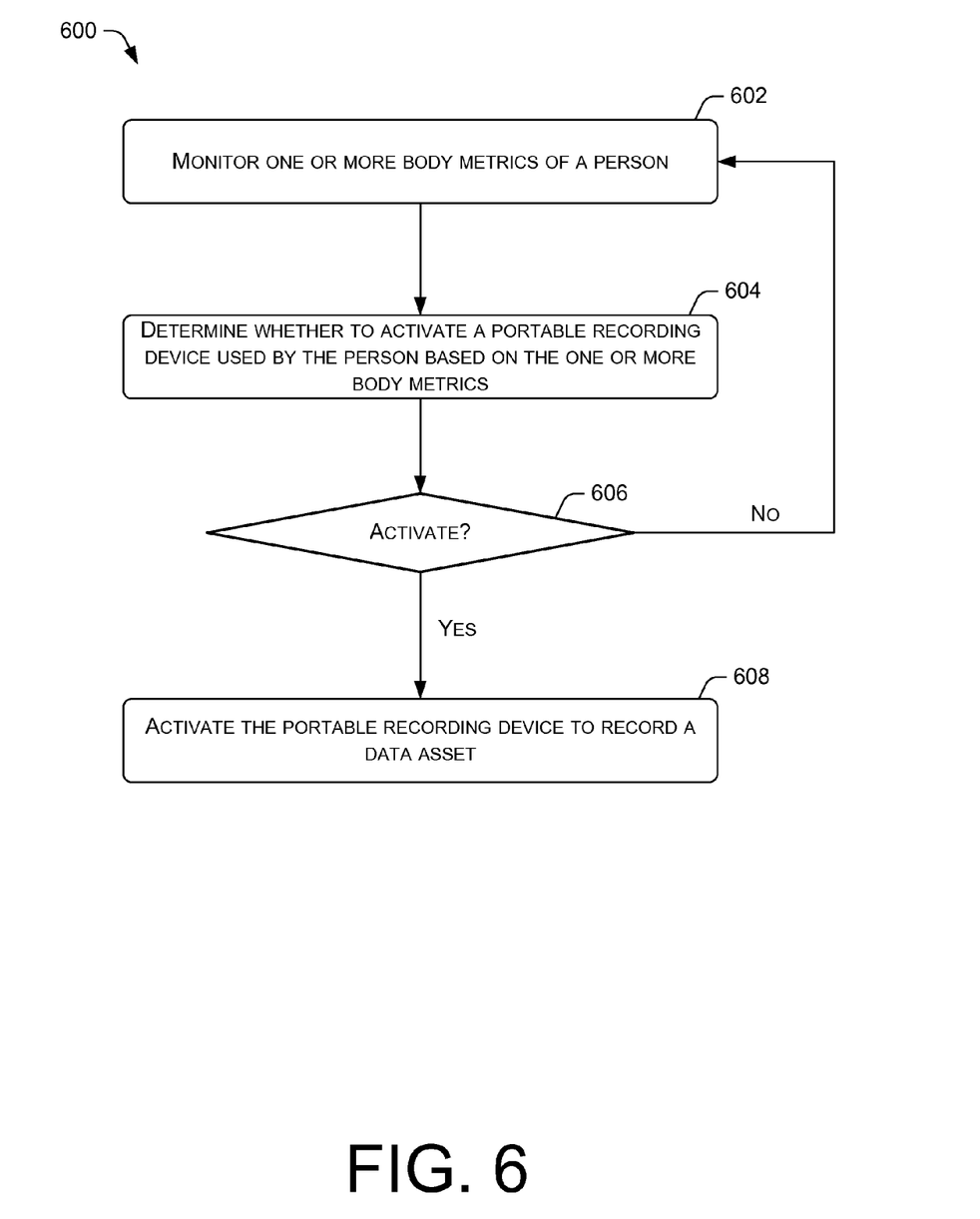
FIG. 6 is a flow diagram of an example process for activating a portable recording device based on body metrics.

FIG. 6 is a flow diagram of an example process 600 for activating a portable recording device based on body metrics. At block 602, a device may monitor one or more body metrics of a person, such as a law enforcement officer. The device may be the portable recording device 114, the computing device 106, or one of the servers 112. The body metrics may include pulse rate, body temperature, gait speed or acceleration, blood pressure, perspiration rate, and/or so forth that are measured by the bio-reader 120.

At block 604, the device may determine whether to activate the portable recording device 114 used by the person to record a data asset based on the one or more body metrics. The data asset may be in the form of a video recording, an audio recording, or a multimedia recording. In various embodiments, the portable recording device 114 may be activated to record the data asset based on each of the one or more body metrics being higher or lower than a corresponding predetermined threshold or a corresponding threshold range.

Accordingly, if the device determines at decision block 606 that the portable recording device 114 is to be activated ("yes" at decision block 606), the process 600 may proceed to block 608. At block 608, the device may activate the portable recording device 114 to record the data asset. However, if the device determines at decision block 606 that the portable recording device 114 is not be activated, the process 600 may loop back to block 602. Upon returning to block 602, the device may further monitor the one or more body metrics of the person.

Figure 7:
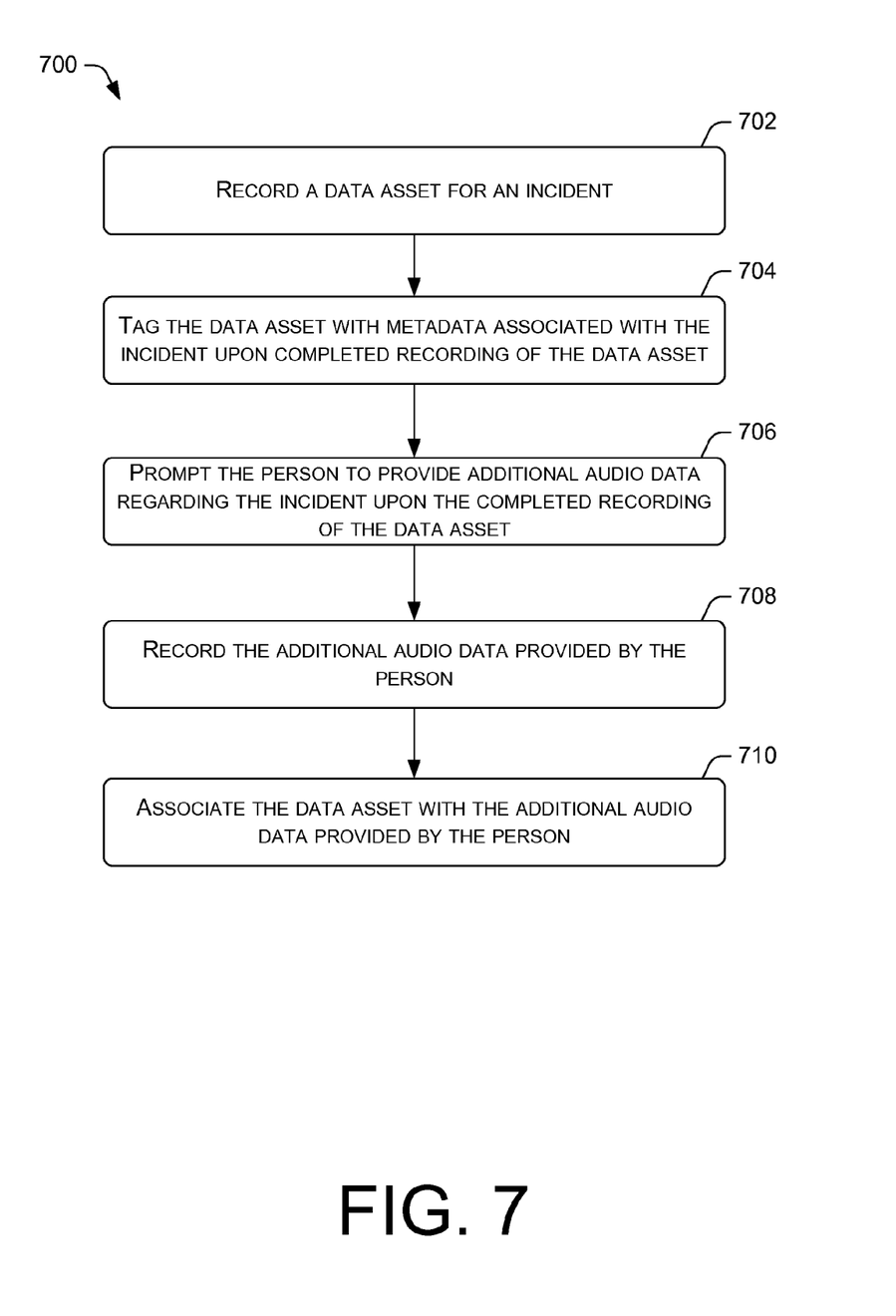
FIG. 7 is a flow diagram of an example process for tagging data assets obtained with additional information at a portable recording device.

FIG. 7 is a flow diagram of an example process 700 for tagging data assets obtained with additional information at a portable recording device. At block 702, the portable recording device 114 may record a data asset for an incident. In some embodiments, the recording of the data asset may be initiated in response to a manual input at the portable recording device 114, an activation signal generated at the portable recording device 114 based on an analysis of body metrics of a person, such as a law enforcement officer. In other embodiments, the recording of the data asset may be initiated in response to an activation signal from the computing device 106 and the network operations center 108.

At block 704, the portable recording device 114 may tag the data asset with metadata associated with the incident upon completed recording of the data asset. In some embodiments, the metadata may include a time and date stamp, a name of the associated law enforcement officer, a badge number of the associated law enforcement officer, a location at which at the data asset is captured, and/or so forth.

At block 706, the portable recording device 114 may prompt the person to provide additional audio data regarding the incident upon the completed recording of the data asset. In various embodiments, the prompt may be in the form of an audio tone, computer generated speech, text information, an indicator light, and/or so forth. At block 708, the portable recording device 114 may record the additional audio data provided by the person. In some embodiments, the audio data may include an incident identifier, an event identifier, a case number, an involved party name, and/or so forth. In other embodiments, the audio data may be a code word, in which the code word is pre-assigned to represent an incident, an event, or a case.

At block 710, the portable recording device 114 may associate the data asset 116 with the additional audio data provided by the person. In various embodiments, the portable recording device 114 may store the data asset, the metadata, and the additional audio data in a memory of the portable recording device 114. The portable recording device 114 may transmit the data asset and the associated metadata and the additional audio data to the computing device 106 and the network operations center 108.

Figure 8:
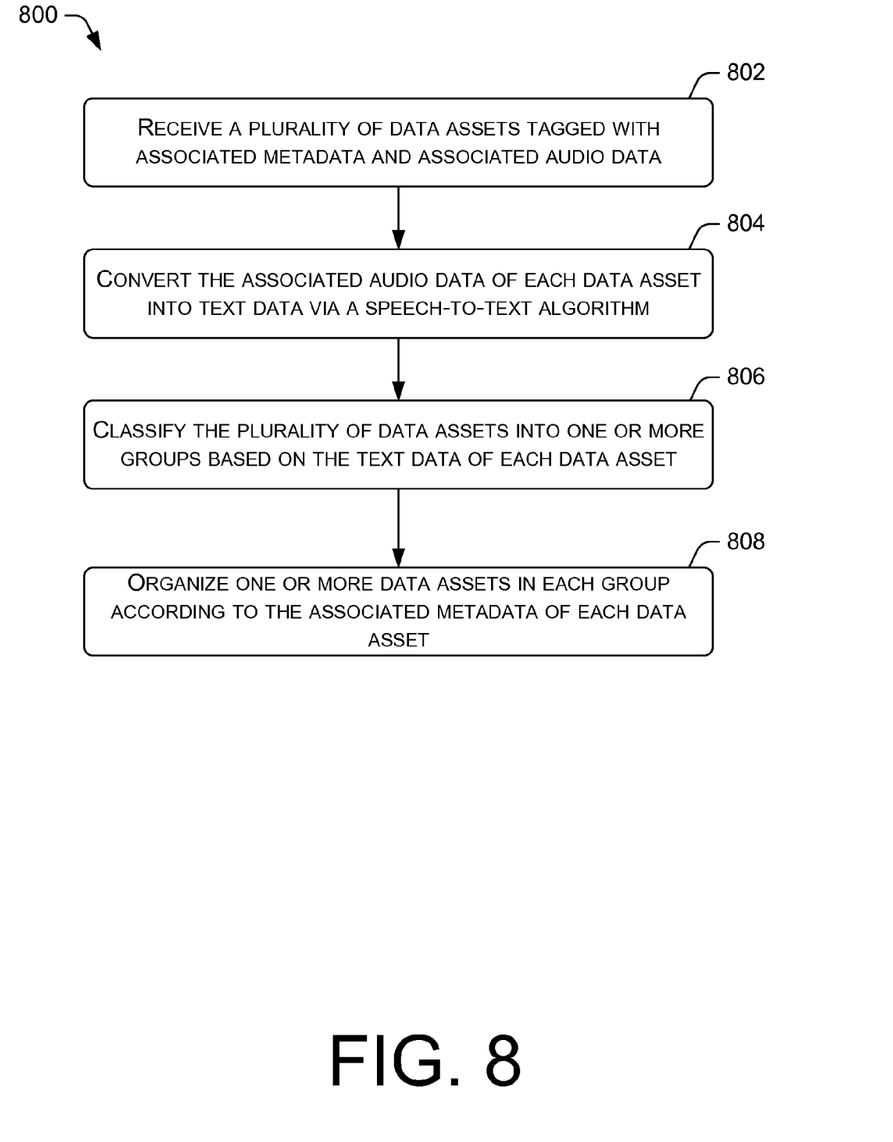
FIG. 8 is a flow diagram of an example process for organizing data assets obtained via the portable recording devices based on classification data.

FIG. 8 is a flow diagram of an example process 800 for organizing data assets obtained via the portable recording devices based on classification data. At block 802, the network operations center 108 may receive a plurality of a data assets tagged with associated metadata and associated audio data. In various embodiments, the network operations center 108 may receive such information via a communication connection with the computing device 106 or the portable recording device 114. For example, the communication connection may be established via the network 110. At block 804, the network operations center 108 may convert the associated audio data of each data asset into corresponding text data via a speech-to-text algorithm.

At block 806, the network operations center 108 may classify the plurality of data assets into one or more groups based on the text data of each data asset. In various embodiments, the groups may include data assets that are grouped according to incidents, events, cases, etc. At block 808, the network operations center 108 may organize one or more data assets in each group according to the associated metadata of each data asset. For example, the data assets in a particular group may be sorted into chronological order based on the metadata of the data assets in the particular group. In other embodiments, the network operations center 108 may aggregated data assets with other pre-existing data that pertain to similar incidents, events, times, cases, and/or so forth, based on the text data and/or the metadata of each data asset.

The techniques may ensure that portable recording devices used by law enforcement officers are activated at the appropriate time even without the direct intervention of the law enforcement officers. Accordingly, such techniques may reduce or eliminate instances in which probative video recordings are not captured because law enforcement officers inadvertently forgot or are otherwise unable to activate portable recording devices. Thus, the automated activation of portable recording devices may enhance the abilities of law enforcement agencies to investigate criminal activities, identify perpetrators of crimes, or examine allegations of police misconduct. While the techniques are described in the context of law enforcement, the automated activation of portable recording devices to capture data assets may also be useful in other fields, such as rescue, firefighting, and transportation sectors. For example, the activation of the portable recording device used by a paramedic may record useful data assets with respect to a rescue operation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   sending, from one or more servers, a dispatch request to a computing device of a person equipped with a portable recording device, the dispatch request dispatching the person to an incident or a scene;
   determining, via the one or more servers, whether the portable recording device is activated by the computing device to record a data asset; and
   activating, via the one or more servers, the portable recording device of the person to record the data asset in response to determining that there is a lack of activation of the portable recording device by the computing device of the person to record the data asset following the sending of the dispatch the request that dispatches the person to the incident or the scene by the one or more servers.

2. The computer-implemented method of claim 1, wherein the activating includes activating the portable recording device in response to determining that there is a lack of activation by the computing device of the portable recording device to record the data asset within a predetermined time period after the sending of the dispatch request.

3. The computer-implemented method of claim 1, further comprising monitoring one or more body metrics of the person equipped with the portable recording device, wherein the activating includes activating the portable recording device in response to determining that (1) there is a lack of activation by the computing device of the portable recording device to record the data asset and (2) each of the one or more body metrics being higher or lower than a corresponding predetermined threshold or a corresponding threshold range.

4. The computer-implemented method of claim 3, wherein the one or more body metrics includes at least one of a pulse rate, a body temperature, a gait speed, a gait acceleration, a blood pressure, or a perspiration rate of the person equipped with the portable recording device.

5. The computer-implemented method of claim 1, wherein the determining includes determining whether the portable recording device is activated by the computing device or a manual input to record the data asset, and wherein the activating the portable recording device in response to determine that neither the activation by the computing device or an activation by the manual input of the portable recording device to record the data asset occurred.

6. The computer-implemented method of claim 5, wherein the sending includes activating the portable recording device in response to determining that there is a lack of activation by the computing device or the manual input of the portable recording device to record the data asset within a predetermined time period.

7. The computer-implemented method of claim 1, wherein the data asset include an audio recording, a video recording, or a multimedia recording.

8. The computer-implemented method of claim 1, wherein the computing device is located in a vehicle or carried by the person equipped with the portable recording device.

9. The computer-implemented method of claim 8, wherein the vehicle is a law enforcement vehicle and the person equipped with the portable recording device is a law enforcement officer.

10. The computer-implemented method of claim 1, wherein the data asset is tagged with metadata regarding an incident that is a subject of the dispatch request, and associated with additional audio data that is provided by the person equipped with the portable recording device in response to a prompt produced by the portable recording device.

11. The computer-implemented method of claim 10, wherein the audio data includes at least one of an incident identifier, an event identifier, a case number, an involved party name, or a code word that represents an incident, an event, or a case.

12. The computer-implemented method of claim 10, further comprising:
receiving a plurality of data assets that includes the data asset and one or more other data assets, each of the plurality of data assets tagged with associated metadata and associated audio data;
converting associated audio data of each data asset of the plurality of data assets into corresponding text data via a speech-to-text algorithm;
classifying the plurality of data assets into one or more groups based on the corresponding text data of the each data asset; and
organizing one or more data assets in each group according to the associated metadata of each data asset.

13. One or more non-transitory computer-readable media storing computer-executable instructions that upon execution cause one or more processors to perform acts comprising:
sending a dispatch request to a computing device of a person equipped with a portable recording device, the dispatch request dispatching the person to an incident or a scene;
determining whether the portable recording device is activated by the computing device to record a data asset or a manual input at the portable recording device; and
activating the portable recording device of the person to record the data asset in response to determining that neither an activation by the computing device of the person nor an activation by the manual input of the portable recording device to record the data asset occurred following the sending of the dispatch request that dispatches the person to the incident or the scene.

14. The one or more non-transitory computer-readable media of claim 13, wherein the activating includes activating the portable recording device in response to determining that neither an activation by the computing device or an activation by the manual input of the portable recording device to record the data asset occurred within a predetermined time period following the sending of the dispatch request.

15. The one or more non-transitory computer-readable media of claim 13, wherein the data asset is tagged with metadata regarding an incident that is a subject of the dispatch request, and associated with additional audio data that is provided by the person equipped with the portable recording device in response to a prompt produced by the portable recording device.

16. The one or more non-transitory computer-readable media of claim 15, further comprising:
receiving a plurality of data assets that includes the data asset and one or more other data assets, each of the plurality of data assets tagged with associated metadata and associated audio data;
converting associated audio data of each data asset of the plurality of data assets into corresponding text data via a speech-to-text algorithm;
classifying the plurality of data assets into one or more groups based on the corresponding text data of the each data asset; and
organizing one or more data assets in each group according to the associated metadata of each data asset.

17. The one or more non-transitory computer-readable media of claim 16, wherein the associated audio data includes at least one of an incident identifier, an event identifier, a case number, an involved party name, or a code word that represents an incident, an event, or a case.

18. The one or more non-transitory computer-readable media of claim 13, wherein the computing device is located in a vehicle or carried by the person equipped with the portable recording device, and wherein the vehicle is a law enforcement vehicle and the person equipped with the portable recording device is a law enforcement officer.

19. A system, comprising:
one or more processors; and
memory having instructions stored therein, the instructions, when executed by the one or more processors, cause the one or more processors to perform acts comprising:
determining whether a portable recording device is activated by a computing device of a person or a manual activation input to the portable recording device to record a data asset;
activating monitoring multiple body metrics of a person equipped with a portable recording device following a dispatch request in response to a lack of activation of the portable recording device by the computing device of the person or the manual activation input to record the data asset in a predetermined time period;
activating the portable recording device to record a data asset in response to determining that each of a first body metric and a second body metric being monitored is higher or lower than a corresponding predetermined threshold or a corresponding threshold range, the data asset including an audio recording, a video recording, or a multimedia recording; and
storing the data asset in at least one of the portable recording device, a computing device that received the dispatch request, or a network operation center server that sent the dispatch request.

20. The system of claim 19, wherein the computing device is located in a vehicle or carried by the person equipped with the portable recording device, and wherein the vehicle is a law enforcement vehicle and the person equipped with the portable recording device is a law enforcement officer.

* * * * *